United States Patent
Chen et al.

(10) Patent No.: US 9,899,858 B2
(45) Date of Patent: Feb. 20, 2018

(54) POWER ADAPTER WITH POWER SAVING MODE AND POWER-SAVING METHOD FOR POWER ADAPTER

(71) Applicant: Chicony Power Technology Co., Ltd., New Taipei (TW)

(72) Inventors: Ping-Sheng Chen, New Taipei (TW); Yang Wang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 121 days.

(21) Appl. No.: 15/040,857

(22) Filed: Feb. 10, 2016

(65) Prior Publication Data

US 2017/0149251 A1    May 25, 2017

(30) Foreign Application Priority Data

Nov. 24, 2015   (TW) .............................. 104139020 A

(51) Int. Cl.
*H02J 7/00*    (2006.01)
*H02J 7/04*    (2006.01)
*H02J 9/00*    (2006.01)

(52) U.S. Cl.
CPC .............. *H02J 7/007* (2013.01); *H02J 7/045* (2013.01); *H02J 9/005* (2013.01); *H02J 2007/0098* (2013.01)

(58) Field of Classification Search
CPC .. H02J 5/005; H02J 7/025; H02J 17/00; H02J 50/12; H02J 7/045; H02J 7/35; H02J 2007/0062; H02J 9/065; H02J 50/20; H02J 50/40; H02J 50/60; H02J 50/80; H02J 7/0068; H02J 7/34; H02J 7/345; H02J 50/70; H02J 50/50; H02J 50/90; H02J 50/05; H03H 7/40
USPC .................................................. 320/107–115
See application file for complete search history.

(56) References Cited

U.S. PATENT DOCUMENTS

| | | | |
|---|---|---|---|
| 2011/0022826 A1* | 1/2011 | More | G06F 1/26 713/1 |
| 2011/0128153 A1* | 6/2011 | Sims | G06F 1/3203 340/636.1 |
| 2012/0007441 A1* | 1/2012 | John | A61N 1/3785 307/104 |

FOREIGN PATENT DOCUMENTS

| | | |
|---|---|---|
| CN | 2242523 Y | 12/1996 |
| CN | 102013705 A | 4/2011 |
| CN | 101604904 B | 7/2011 |
| CN | 202772617 U | 3/2013 |
| CN | 203481855 U | 3/2014 |
| TW | 468299 B | 12/2001 |
| TW | 201232881 A | 8/2012 |
| TW | M-520156 U | 4/2016 |

* cited by examiner

*Primary Examiner* — Binh Tat
(74) *Attorney, Agent, or Firm* — Muncy, Geissler, Olds & Lowe, P.C.

(57) ABSTRACT

A power adapter with a power saving mode includes a power adaptation unit. The power adaptation unit includes a pulse width modulation control unit and a power saving signal receiver. The power saving signal receiver is electrically connected to the pulse width modulation control unit. When the power adapter enters a working status, the power adapter charges a battery. After the power saving signal receiver receives a battery fully-charged signal, the power adapter enters a sleeping status.

7 Claims, 4 Drawing Sheets

POWER ADAPTER WITH POWER SAVING MODE AND POWER-SAVING METHOD FOR POWER ADAPTER

BACKGROUND OF THE INVENTION

Field of the Invention

The present invention relates to a power adapter and a power-saving method, and especially relates to a power adapter with a power saving mode and a power-saving method for a power adapter.

Description of the Related Art

Currently, the operating principle of the related art power adapter is that when the related art power adapter is removed from the system (for example, the computer) by the user, the related art power adapter enters the sleeping mode to save power. However, when the user leaves from the system (for example, the computer), the user usually does not remove the related art power adapter from the system (for example, the computer), so that the related art power adapter is always in the working mode and cannot save power.

SUMMARY OF THE INVENTION

In order to solve the above-mentioned problems, an object of the present invention is to provide a power adapter with a power saving mode.

In order to solve the above-mentioned problems, another object of the present invention is to provide a power-saving method for a power adapter.

In order to achieve the object of the present invention mentioned above, the power adapter comprises a power adaptation unit. The power adaptation unit includes a pulse width modulation control unit and a power saving signal receiver. The power saving signal receiver is electrically connected to the pulse width modulation control unit. When the power adapter enters a working status, the power adapter charges a battery. After the power saving signal receiver receives a battery fully-charged signal, the power adapter enters a sleeping status.

In order to achieve another object of the present invention mentioned above, the power-saving method is applied to a power adapter and an electronic apparatus. The power-saving method comprises following steps. When the power adapter enters a working status, the power adapter charges a battery of the electronic apparatus. When the battery is fully charged, the electronic apparatus sends a battery fully-charged signal to the power adapter. After the power adapter receives the battery fully-charged signal, the power adapter enters a sleeping status. When the power adapter enters the sleeping status, the power adapter starts to count a predetermined time. After the power adapter finishes counting the predetermined time, the power adapter enters the working status and recharges the battery.

The advantage of the present invention is that when the battery is fully charged, the power adapter enters the sleeping status to save power effectively. Moreover, when the power adapter is not electrically connected to the electronic apparatus, the power adapter automatically enters a normal working mode.

DETAILED DESCRIPTION OF THE INVENTION

Please refer to following detailed description and figures for the technical content of the present invention. The following detailed description and figures are referred for the present invention, but the present invention is not limited to it.

Figure 1:
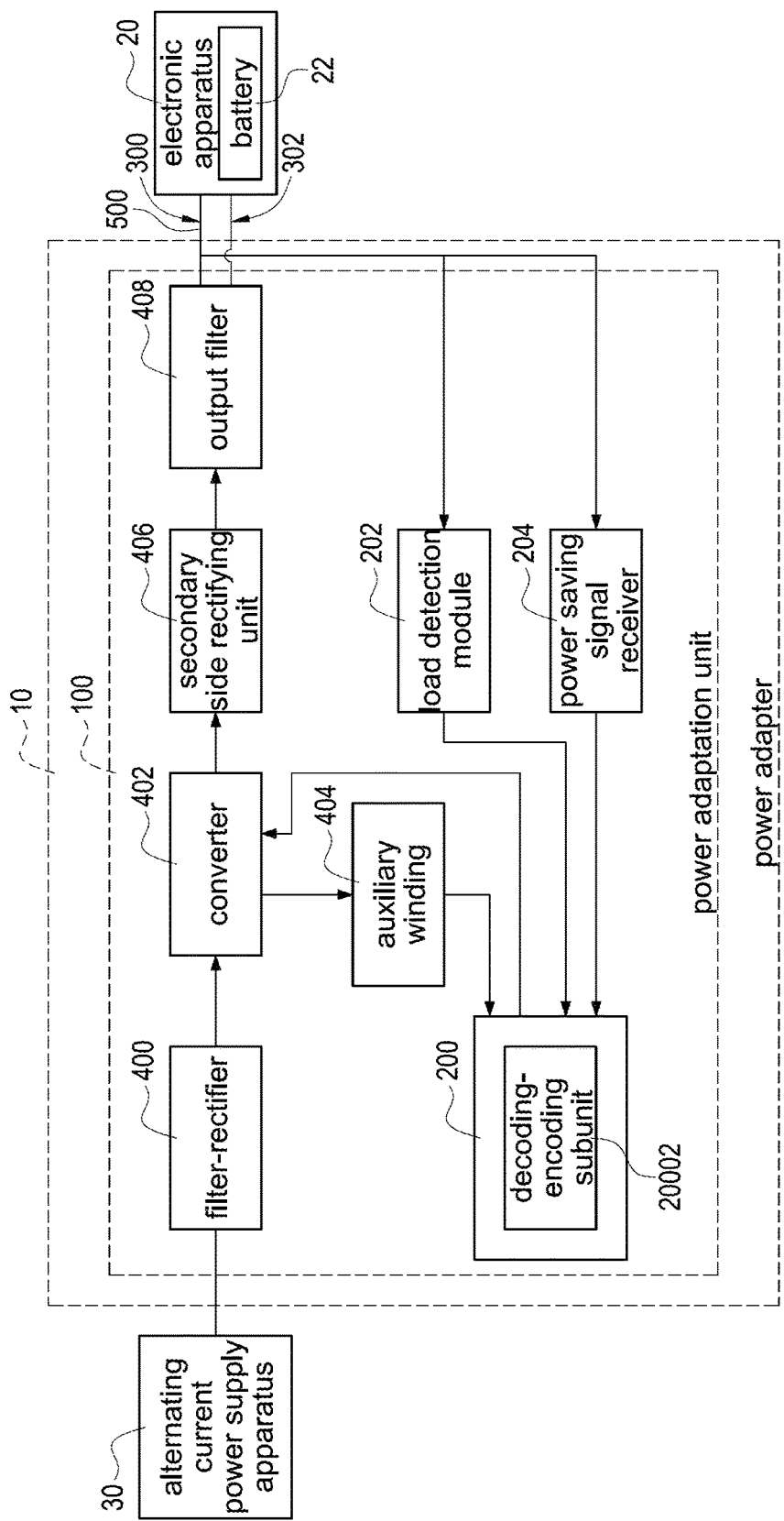
FIG. 1 shows a block diagram of the first embodiment of the power adapter with the power saving mode of the present invention.

FIG. 1 shows a block diagram of the first embodiment of the power adapter with the power saving mode of the present invention. A power adapter 10 with a power saving mode is applied to an alternating current power supply apparatus 30. The power adapter 10 comprises a power adaptation unit 100, a power line 300 and a grounding line 302. The power adaptation unit 100 comprises a pulse width modulation control unit 200, a load detection module 202, a power saving signal receiver 204, a filter-rectifier 400, a converter 402, an auxiliary winding 404, a secondary side rectifying unit 406 and an output filter 408. The pulse width modulation control unit 200 comprises a decoding-encoding subunit 20002.

The power saving signal receiver 204 is electrically connected to the pulse width modulation control unit 200. The power line 300 is electrically connected to an electronic apparatus 20 and the power saving signal receiver 204. The grounding line 302 is electrically connected to the power adaptation unit 100 and the electronic apparatus 20. The converter 402 is electrically connected to the pulse width modulation control unit 200 and the filter-rectifier 400. The auxiliary winding 404 is electrically connected to the converter 402 and the pulse width modulation control unit 200. The secondary side rectifying unit 406 is electrically connected to the converter 402. The output filter 408 is electrically connected to the secondary side rectifying unit 406, the power line 300 and the grounding line 302. The load detection module 202 is electrically connected to the pulse width modulation control unit 200 and the electronic apparatus 20.

When the power adapter 10 enters a working status, the power adapter 10 charges a battery 22 of the electronic apparatus 20. After the power saving signal receiver 204 receives a battery fully-charged signal 500, the power adapter 10 enters a sleeping status. In an embodiment, the electronic apparatus 20 sends the battery fully-charged signal 500 to the power saving signal receiver 204 through the power line 300.

When the power adapter 10 enters the sleeping status, the pulse width modulation control unit 200 starts to count a predetermined time. After the pulse width modulation control unit 200 finishes counting the predetermined time, the power adapter 10 enters the working status and recharges the battery 22.

When the power adapter 10 enters the sleeping status, if the battery 22 needs to be charged by the power adapter 10, the electronic apparatus 20 informs the pulse width modulation control unit 200 through the power line 300, the power saving signal receiver 204 and the decoding-encoding subunit 20002 that the battery 22 needs to be charged by the power adapter 10, so that the power adapter 10 enters the working status and charges the battery 22.

Figure 4:
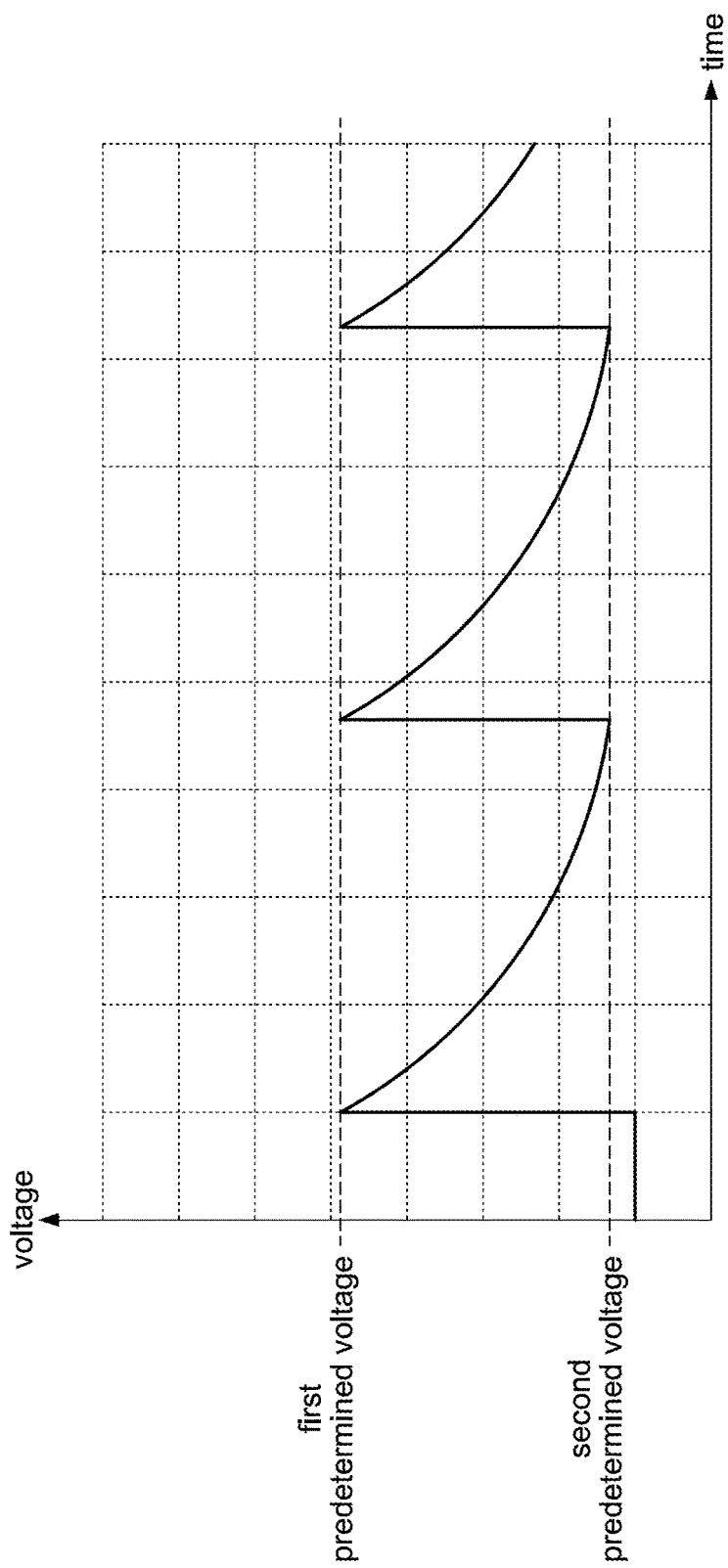
FIG. 4 shows a voltage waveform diagram of an output voltage of the power adapter of the present invention without a load.

FIG. 4 shows a voltage waveform diagram of an output voltage of the power adapter of the present invention without a load. When the load detection module 202 detects that the power adapter 10 is not electrically connected to the electronic apparatus 20, the power adapter 10 automatically enters a normal working mode, so that the pulse width modulation control unit 200 intermittently drives the converter 402. When an output voltage of the power adapter 10 is higher than a first predetermined voltage, the pulse width modulation control unit 200 stops driving the converter 402. When the output voltage of the power adapter 10 is lower than a second predetermined voltage, the pulse width modulation control unit 200 starts to drive the converter 402.

The auxiliary winding 404 outputs an electric power to drive the pulse width modulation control unit 200.

Figure 2:
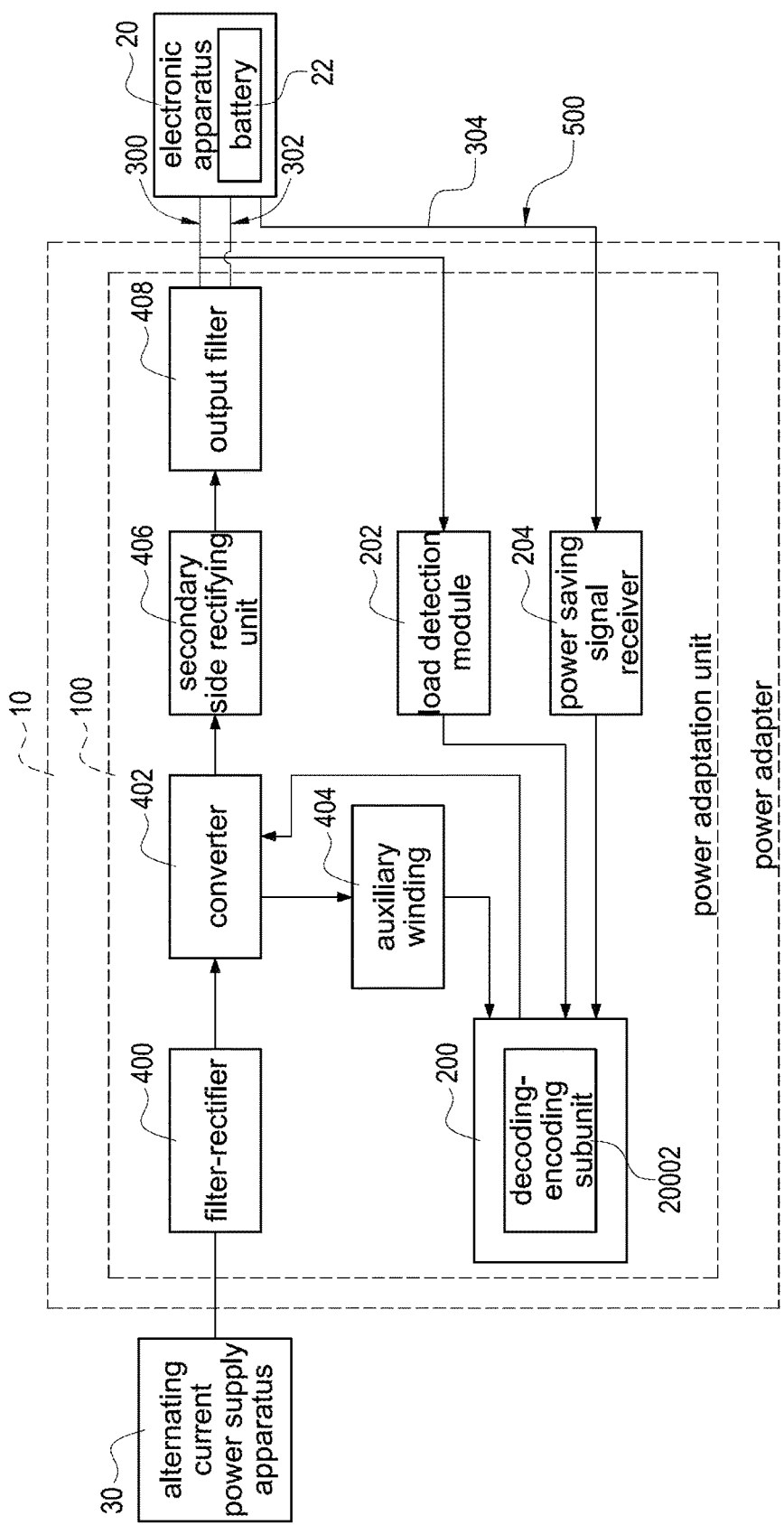
FIG. 2 shows a block diagram of the second embodiment of the power adapter with the power saving mode of the present invention.

FIG. 2 shows a block diagram of the second embodiment of the power adapter with the power saving mode of the present invention. The description for the elements shown in FIG. 2, which are similar to those shown in FIG. 1, is not repeated here for brevity. Moreover, the power adapter 10 further comprises a power line 300, a grounding line 302 and a signal line 304.

The power line 300 is electrically connected to the power adaptation unit 100 and the electronic apparatus 20. The grounding line 302 is electrically connected to the power adaptation unit 100 and the electronic apparatus 20. The signal line 304 is electrically connected to the power saving signal receiver 204 and the electronic apparatus 20. The electronic apparatus 20 sends the battery fully-charged signal 500 to the power saving signal receiver 204 through the signal line 304.

After the power adapter 10 enters the sleeping status, if the battery 22 needs to be charged by the power adapter 10, the electronic apparatus 20 informs the pulse width modulation control unit 200 through the signal line 304 and the power saving signal receiver 204 that the battery 22 needs to be charged by the power adapter 10, so that the power adapter 10 enters the working status and charges the battery 22.

Figure 3:
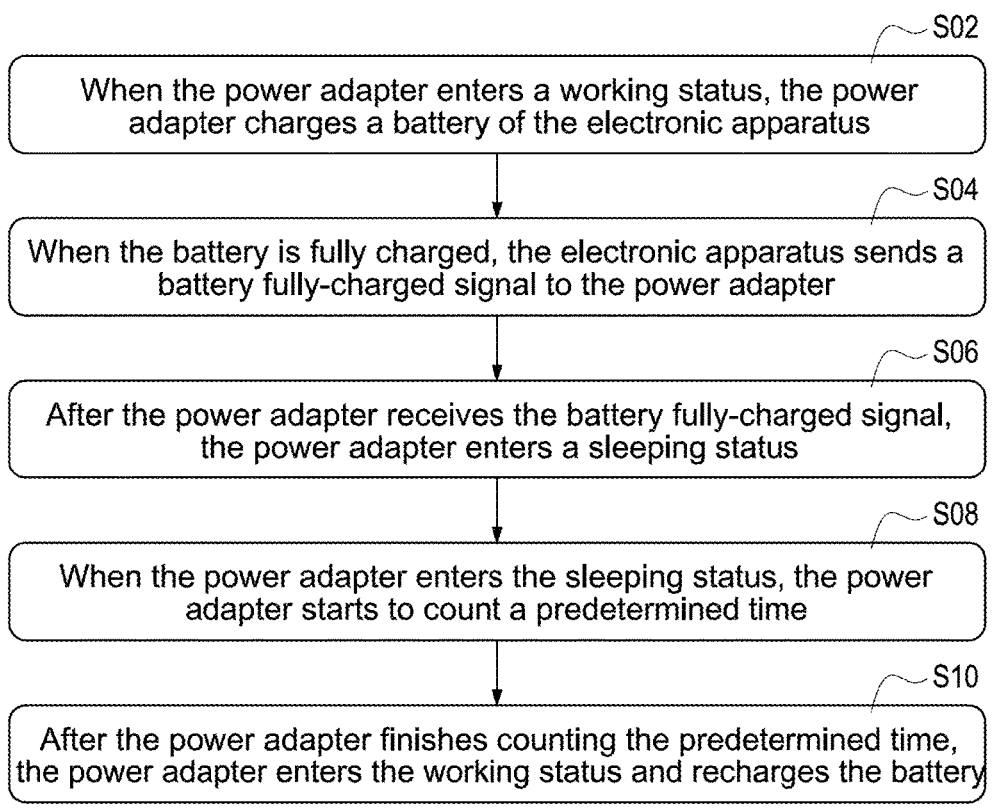
FIG. 3 shows a flow chart of the power-saving method for the power adapter of the present invention.

FIG. 3 shows a flow chart of the power-saving method for the power adapter of the present invention. A power-saving method is applied to a power adapter and an electronic apparatus. The power-saving method comprises following steps.

S02: When the power adapter enters a working status, the power adapter charges a battery of the electronic apparatus.

S04: When the battery is fully charged, the electronic apparatus sends a battery fully-charged signal to the power adapter.

S06: After the power adapter receives the battery fully-charged signal, the power adapter enters a sleeping status.

S08: When the power adapter enters the sleeping status, the power adapter starts to count a predetermined time.

S10: After the power adapter finishes counting the predetermined time, the power adapter enters the working status and recharges the battery.

When the power adapter is detected that the power adapter is not electrically connected to the electronic apparatus, the power adapter automatically enters a normal working mode, so that a pulse width modulation control unit of the power adapter intermittently drives a converter of the power adapter. When an output voltage of the power adapter is higher than a first predetermined voltage, the pulse width modulation control unit stops driving the converter. When the output voltage of the power adapter is lower than a second predetermined voltage, the pulse width modulation control unit starts to drive the converter. The other contents of the power-saving method are similar to the contents of FIG. 1 and FIG. 2 and would be omitted here for brevity.

The advantage of the present invention is that when the battery 22 is fully charged, the power adapter 10 enters the sleeping status to save power effectively. Moreover, when the power adapter 10 is not electrically connected to the electronic apparatus 20, the power adapter 10 automatically enters the normal working mode.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power adapter with a power saving mode comprising:
   a power adaptation unit comprises:
      a pulse width modulation control unit, comprising a decoding-encoding subunit; and
      a power saving signal receiver electrically connected to the pulse width modulation control unit;
   a power line electrically connected to an electronic apparatus having a battery and the power saving signal receiver; and
   a grounding line electrically connected to the power adaptation unit and the electronic apparatus,
   wherein when the power adapter enters a working status, the power adapter charges the battery; after the power saving signal receiver receives a battery fully-charged signal sent from the electronic apparatus through the power line, the power adapter enters a sleeping status, and
   wherein when the power adapter enters the sleeping status, if the battery needs to be charged by the power adapter, the electronic apparatus informs the pulse width modulation control unit through the power line, the power saving signal receiver, and the decoding-encoding subunit so that the power adapter enters the working status and charges the battery.

2. The power adapter in claim 1, wherein the power adaptation unit further comprise:
   a filter-rectifier;
   a converter electrically connected to the pulse width modulation control unit and the filter-rectifier; and
   an auxiliary winding electrically connected to the converter and the pulse width modulation control unit,
   wherein the auxiliary winding outputs an electric power to drive the pulse width modulation control unit.

3. The power adapter in claim 2, wherein the power adaptation unit further comprise:
   a secondary side rectifying unit electrically connected to the converter; and
   an output filter electrically connected to the secondary side rectifying unit, the power line and the grounding line.

4. The power adapter in claim 1, further comprising:
   a power line electrically connected to the power adaptation unit and an electronic apparatus;
   a grounding line electrically connected to the power adaptation unit and the electronic apparatus; and
   a signal line electrically connected to the power saving signal receiver and the electronic apparatus, wherein the electronic apparatus sends the battery fully-charged signal to the power saving signal receiver through the signal line.

5. The power adapter in claim 4, wherein after the power adapter enters the sleeping status, if the battery needs to be charged by the power adapter, the electronic apparatus informs the pulse width modulation control unit through the signal line and the power saving signal receiver that the battery needs to be charged by the power adapter, so that the power adapter enters the working status and charges the battery.

6. The power adapter in claim 1, wherein the power adaptation unit further comprise:
   a load detection module electrically connected to the pulse width modulation control unit and an electronic apparatus,
   wherein when the load detection module detects that the power adapter is not electrically connected to the electronic apparatus, the power adapter automatically enters a normal working mode, so that the pulse width modulation control unit intermittently drives a converter of the power adapter; when an output voltage of the power adapter is higher than a first predetermined voltage, the pulse width modulation control unit stops driving the converter; when the output voltage of the power adapter is lower than a second predetermined voltage, the pulse width modulation control unit starts to drive the converter.

7. A power-saving method applied to a power adapter with a power saving mode and an electronic apparatus, wherein the power adapter comprises a power saving signal receiver and a pulse width modulation control unit having a decoding-encoding subunit, the power-saving method comprising:
   a. when the power adapter enters a working status, the power adapter charging a battery of the electronic apparatus;
   b. when the battery is fully charged, the electronic apparatus sending a battery fully-charged signal to the power adapter through a power line;
   c. after the power adapter receives the battery fully-charged signal, the power adapter entering a sleeping status; and
   d. when the power adapter enters the sleeping status, if the battery needs to be charged by the power adapter, the electronic apparatus informs the pulse width modulation control unit through the power line, the power saving signal receiver, and the decoding-encoding subunit so that the power adapter enters the working status and charges the battery.

\* \* \* \* \*